United States Patent
Vijchulata et al.

(10) Patent No.: US 6,415,975 B1
(45) Date of Patent: Jul. 9, 2002

(54) DETERMINATION OF QUALITY OF BONDING BETWEEN A CONDUCTIVE BALL AND A CONDUCTIVE PAD WITHIN AN IC PACKAGE

(75) Inventors: Prakorn Vijchulata, Bangkok; Watana Sabyeying, Nonthaburi, both of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2 days.

(21) Appl. No.: 09/713,373

(22) Filed: Nov. 15, 2000

Related U.S. Application Data

(62) Division of application No. 09/602,733, filed on Jun. 26, 2000, now Pat. No. 6,193,134.

(51) Int. Cl.[7] .................. B23K 1/018; B23K 13/08; B23K 1/20
(52) U.S. Cl. ................ 228/264; 228/8; 228/13; 324/765; 356/72; 216/2
(58) Field of Search ............ 73/760–860; 382/145–151, 382/162–167; 228/8, 264, 13; 324/753, 765; 356/36, 72, 401, 402; 216/2

(56) References Cited

U.S. PATENT DOCUMENTS

| | | | |
|---|---|---|---|
| 3,802,973 A | * 4/1974 | Smith .................... 216/103 |
| 4,184,175 A | * 1/1980 | Mullane, Jr. ............ 250/559.08 |
| 4,548,285 A | * 10/1985 | Sells et al. ............. 177/1 |
| 4,585,519 A | * 4/1986 | Jaffe et al. .............. 216/102 |
| 4,944,447 A | * 7/1990 | Thome .................. 228/103 |
| 5,030,008 A | * 7/1991 | Scott et al. ............. 348/126 |
| 5,719,952 A | * 2/1998 | Rooks .................... 378/22 |
| 5,795,490 A | * 8/1998 | Momose ................. 156/345 |
| 5,909,244 A | * 6/1999 | Chakravarti et al. ..... 257/301 |
| 5,943,437 A | * 8/1999 | Sumie et al. ............ 382/145 |
| 5,970,310 A | * 10/1999 | Satoh et al. ............. 438/128 |
| 6,124,769 A | * 9/2000 | Igarashi et al. .......... 333/172 |
| 6,133,119 A | * 10/2000 | Yamazaki ................ 438/471 |
| 6,230,963 B1 | * 5/2001 | Hertz ..................... 228/246 |

* cited by examiner

*Primary Examiner*—M. Alexandra Elve
*Assistant Examiner*—Colleen P. Cooke
(74) *Attorney, Agent, or Firm*—Monica H. Choi

(57) ABSTRACT

The quality of bonding between a conductive ball and a conductive pad of a lead frame strip of an IC package are determined by etching the conductive ball from the conductive pad, and analyzing the bottom view of the conductive ball. The conductive ball is comprised of a first conductive material and a conductive pad is comprised of a second conductive material. The conductive ball is bonded to the conductive pad by formation of an intermediary material formed from the first conductive material of the conductive ball and the second conductive material of the conductive pad. The lead frame strip is immersed within an etching solution such that the intermediary material is etched between the conductive ball and the conductive pad until the conductive ball may be decoupled from the conductive pad. The conductive ball has a first color in areas where the intermediary material was not abutting the conductive ball and has a second color in areas where the intermediary material was abutting the conductive ball when the conductive ball was bonded to the conductive pad. The intermediary material was abutting an intermediary material area of the conductive ball when the conductive ball was bonded to the conductive pad. A magnified image of the intermediary material area on the conductive ball is captured by a microscope with the intermediary material area being substantially centered within the magnified image while the conductive ball is decoupled from the conductive pad. The magnified image of the intermediary material area on the conductive ball is analyzed by a data processor to determine quality of bonding between the conductive ball and the conductive pad.

5 Claims, 4 Drawing Sheets

DETERMINATION OF QUALITY OF BONDING BETWEEN A CONDUCTIVE BALL AND A CONDUCTIVE PAD WITHIN AN IC PACKAGE

This is a divisional of an earlier filed copending patent application with Ser. No. 09/602,733 filed on Jun. 26, 2000 now U.S. Pat. No. 6,193,134, for which priority is claimed. This earlier filed copending patent application with Ser. No. 09/602,733 is in its entirety incorporated herewith by reference.

TECHNICAL FIELD

The present invention relates generally to IC (integrated circuit) packages, and more particularly, to a method and system for determining the quality of bonding between a conductive ball and a conductive pad of an IC (integrated circuit) die within an IC package by etching the conductive ball from the conductive pad and analyzing a magnified image of the bottom of the conductive ball.

BACKGROUND OF THE INVENTION

An IC (integrated circuit) die typically is housed within an IC (integrated circuit) package having leads that are coupled to conductive pads on the IC die for providing connection to nodes of the integrated circuit. Referring to FIG. 1, a cross sectional view of a lead frame strip 100 of an IC package includes an IC die 102 mounted on a die frame dap 104. The die frame dap 104 is coupled to the lead frame strip 100 via tie bars 108. The structures of the lead frame strip 100 are part of an IC package and are known to one of ordinary skill in the art of IC package manufacture.

Further referring to FIG. 1, a lead interconnect 112 of the lead frame strip 100 is coupled to a conductive pad on the IC die 102 for providing connection to a node of the integrated circuit of the IC die 102. A conductive ball 114 is bonded to a conductive pad 116 on the IC die 102. The conductive ball 114 is coupled to the lead interconnect 112 via a wire 118. FIG. 1 is a cross sectional view along a line A—A of a top view of the lead frame strip 100 of FIG. 2.

The performance of the integrated circuit of the IC die 102 is determined by the quality of bonding between the conductive ball 114 and the conductive pad 116. Referring to FIG. 3A, the conductive ball 114 is bonded to the conductive pad 116 using an ultrasonic and heating process to form an intermediary material 120 that bonds the conductive ball 114 to the conductive pad 116, as known to one of ordinary skill in the art of IC package manufacture. In the ultrasonic and heating process, the intermediary material 120 is formed from a first conductive material of the conductive ball 114 and a second conductive material of the conductive pad 116. For example, if the conductive ball 114 is comprised of gold and the conductive pad 116 is comprised of aluminum, then the intermediary material 120 is comprised of an intermetallic alloy ($Au_xAl_y$) formed from the gold of the gold ball 114 and the aluminum of the aluminum pad 116.

FIG. 3A illustrates an example of poor bonding between the conductive ball 114 and the conductive pad 116. In FIG. 3A, a relatively low amount of material of the conductive ball 114 and the conductive pad 116 have been used to form a low amount of the intermediary material 120. With such low amount of intermediary material 120 bonding the conductive ball 114 to the conductive pad 116, the conductive ball 114 may have high resistance poor contact with the conductive pad 116. Such high resistance degrades the speed performance of the integrated circuit within the IC die 102.

FIG. 3B illustrates an example of good bonding between the conductive ball 114 and the conductive pad 116. In FIG. 3B, a relatively high amount of material of the conductive ball 114 and the conductive pad 116 have been used to form a high amount of the intermediary material 120. With such high amount of intermediary material 120 bonding the conductive ball 114 to the conductive pad 116, the conductive ball 114 may have low resistance good contact with the conductive pad 116. Such low resistance enhances the speed performance of the integrated circuit within the IC die 102.

Because the performance of the integrated circuit within the IC die 102 depends on the quality of bonding between the conductive ball 114 with the conductive pad 116, the quality of bonding is monitored during manufacture of IC packages. Referring to FIG. 4A, in the prior art, a cross section along line B—B is made to result in the cross sectional view of FIG. 4B of the intermediary material 120 between the conductive ball 114 and the conductive pad 116. Such a cross sectional view is analyzed to determine the quality of bonding between the conductive ball 114 and the conductive pad 116. For example, a resin material is formed around the conductive ball 114 and the conductive pad 116, and the conductive ball 114 and the conductive pad 116 are polished from the side inward to the cross section B—B to result in the cross sectional view of FIG. 4B.

For consistent analysis, the cross section B—B should consistently be through the center of the conductive ball 114 as multiple IC packages are examined. However, polishing down to the exact center of the conductive ball 114 in the prior art is difficult to control. Referring to FIG. 5A, if the cross section B—B is not at the center of the conductive ball 114, then the cross sectional view of FIG. 5B results with an inaccurate representation of the amount of intermediary material 120 between the conductive ball 114 and the conductive pad 116. Thus, the quality of the bonding between the conductive ball 114 and the conductive pad 116 cannot be consistently determined with the polishing method of the prior art.

In addition, a cross section of the intermediary material 120 may not be an accurate representation of the quality of bonding between the conductive ball 114 and the conductive pad 116. For example, if a void or a contaminant is present within the intermediary material 120, and if the cross section is not through such a void or contaminant, then the cross section alone may not represent the poor contact between the contact ball 114 and the contact pad 116 from such a void or contaminant.

Nevertheless, because bonding between the conductive ball 114 and the conductive pad 116 in an IC package determines the performance of the integrated circuit, accurate and consistent determination of the quality of bonding is desired.

SUMMARY OF THE INVENTION

Accordingly, in a general aspect of the present invention, the quality of bonding between a conductive ball and a conductive pad of a lead frame strip of an IC package is determined by etching the conductive ball from the conductive pad and analyzing the bottom of the conductive ball.

The conductive ball is comprised of a first conductive material and a conductive pad is comprised of a second conductive material. The conductive ball is bonded to the conductive pad by formation of an intermediary material formed from the first conductive material of the conductive ball and the second conductive material of the conductive pad.

In one embodiment of the present invention, the lead frame strip is immersed within an etching solution such that the intermediary material is etched between the conductive ball and the conductive pad until the conductive ball may be decoupled from the conductive pad. The conductive ball has a first color in areas where the intermediary material was not abutting the conductive ball and has a second color in areas where the intermediary material was abutting the conductive ball when the conductive ball was bonded to the conductive pad. The intermediary material was abutting an intermediary material area of the conductive ball when the conductive ball was bonded to the conductive pad. A magnified image of the intermediary material area on the conductive ball is captured by a microscope with the intermediary material area being substantially centered within the magnified image when the conductive ball is decoupled from the conductive pad.

The intermediary material area appears as the second color within the magnified image, and an area of the conductive ball wherein the intermediary material was not abutting the conductive ball appears as the first color within the magnified image. The magnified image of the intermediary material area on the conductive ball is analyzed by a data processor to determine quality of bonding between the conductive ball and the conductive pad.

The present invention may be used to particular advantage when the data processor calculates a percentage of the intermediary material area to a total area of the conductive ball within the magnified image to determine the quantity of bonding between the conductive ball and the conductive pad.

In another embodiment of the present invention, the etching solution is comprised of about 30% (weight/volume) sodium hydroxide (NaOH) at a temperature of about 80° Celsius, and the lead frame strip is immersed in the etching solution for a time period of about 1 minute for optimized etching of the intermediary material between the conductive ball and the conductive pad.

In this manner, the quality of bonding between the conductive ball and the conductive pad may be consistently and accurately determined for a plurality of IC packages during manufacture of a high quantity of IC packages.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, and 10 refer to elements having similar structure and function.

DETAILED DESCRIPTION

Figure 1:
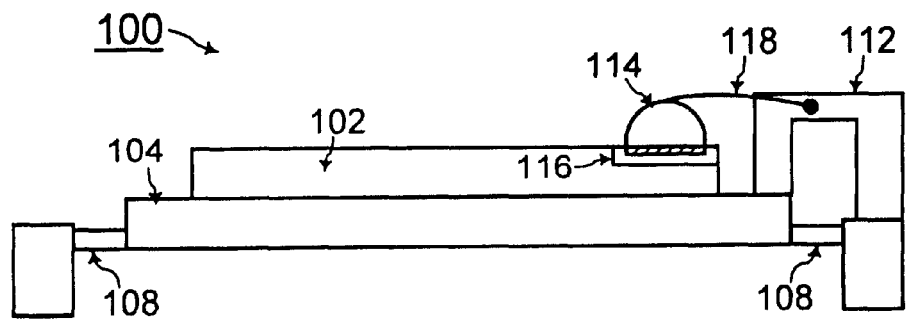
FIG. 1 shows a cross sectional view of a lead frame strip of an IC (integrated circuit) package having a conductive ball bonded to a conductive pad of an IC (integrated circuit) die.
Figure 2:
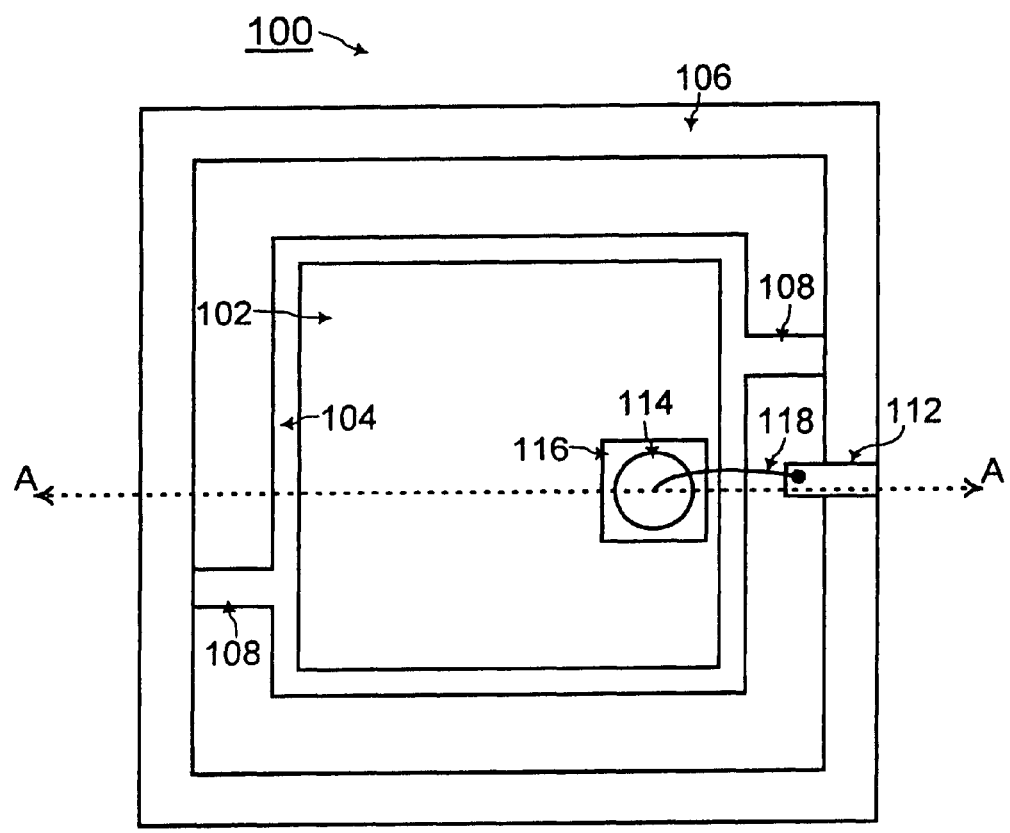
FIG. 2 shows a top view of the lead frame strip of FIG. 1.
Figure 3A:
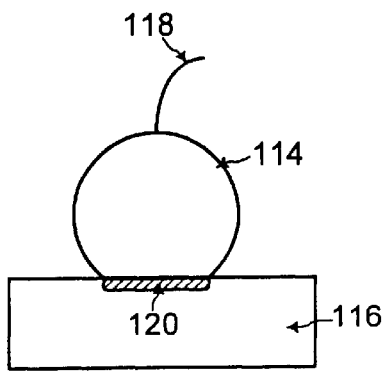
FIG. 3A shows a cross sectional view of the conductive ball bonded to the conductive pad with poor bonding.
Figure 3B:
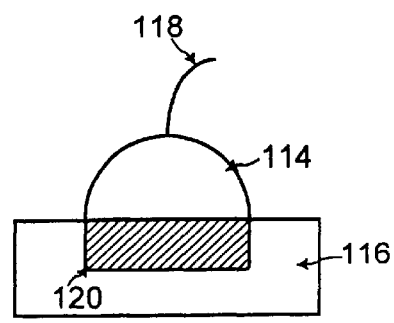
FIG. 3B shows a cross sectional view of the conductive ball bonded to the conductive pad with good bonding.
Figure 4A:
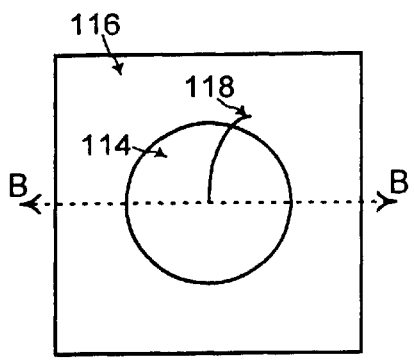
FIG. 4A shows a top view of the conductive ball and the conductive pad with a cross section line being across the center of the conductive ball.
Figure 4B:
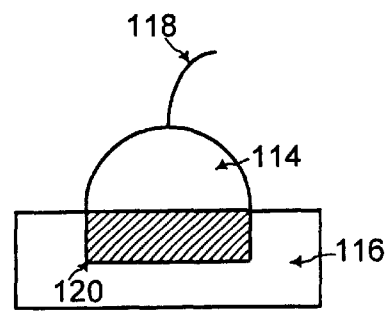
FIG. 4B shows the cross sectional view of the conductive ball bonded to the conductive pad along the cross section line of FIG. 4A, for analysis of the quality of the bonding between the conductive ball and the conductive pad in the prior art.
Figure 5A:
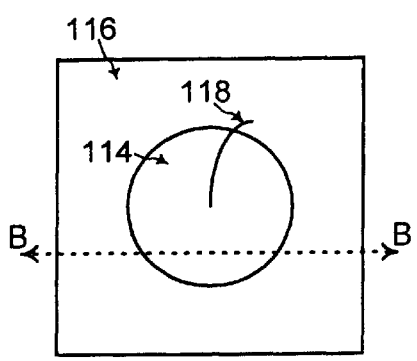
FIG. 5A shows a top view of the conductive ball and the conductive pad with a cross section line being far from the center of the conductive ball.
Figure 5B:
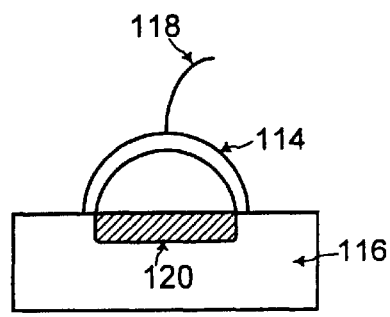
FIG. 5B shows the cross sectional view of the conductive ball bonded to the conductive pad along the cross section line of FIG. 5A, for analysis of the quality of the bonding between the conductive ball and the conductive pad in the prior art.
Figure 6:
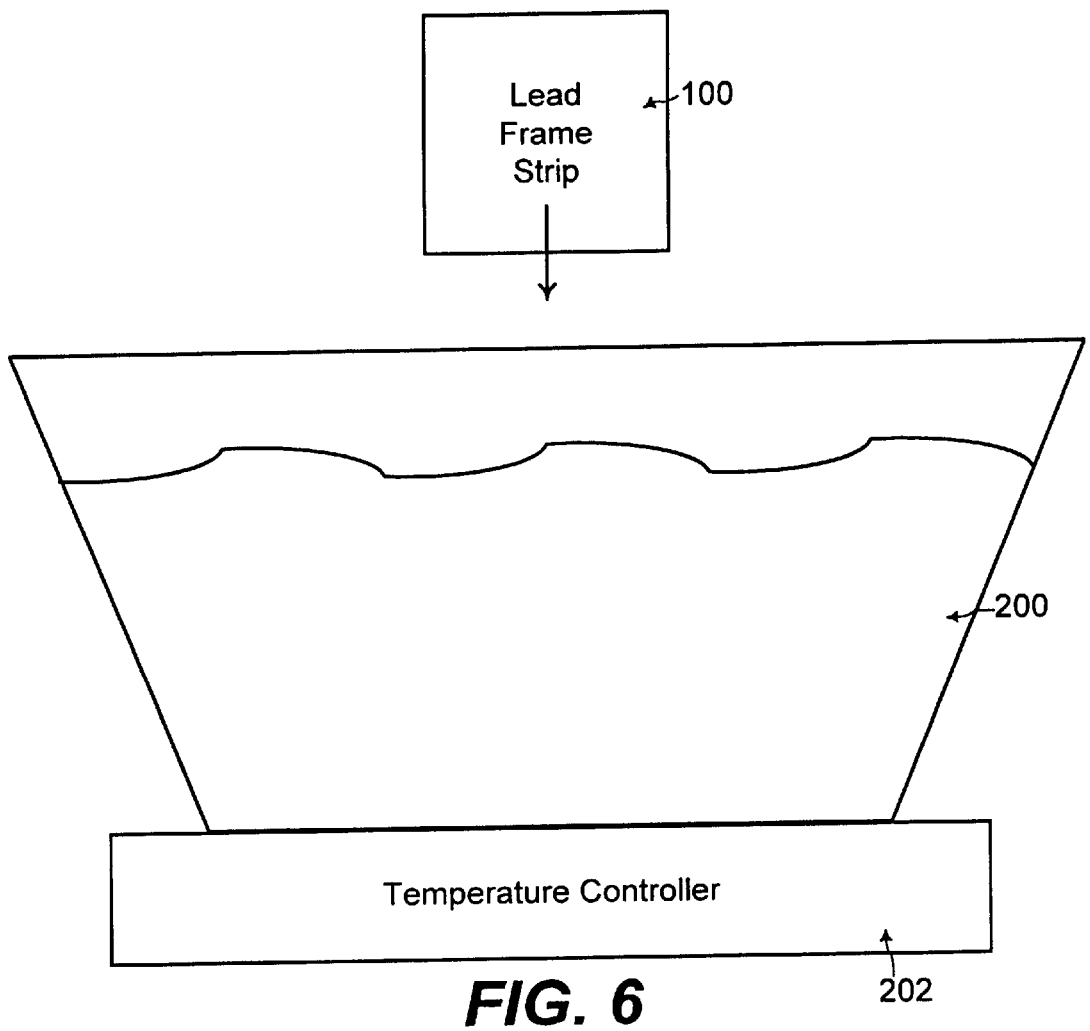
FIG. 6 illustrates a bath of etching solution for etching the conductive ball from the conductive pad of the lead frame strip, according to an embodiment of the present invention.
Figure 7:
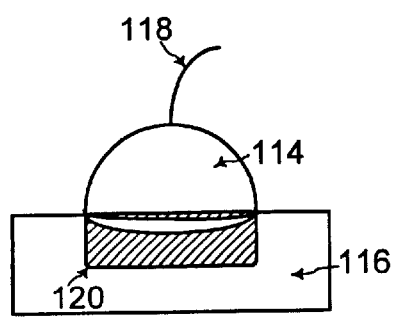
FIG. 7 illustrates the cross section of the conductive ball and the conductive pad after etching of the intermediary material between the conductive ball and the conductive pad such that the conductive ball may be decoupled from the conductive pad, according to an embodiment of the present invention.

Referring to FIG. 6, for determining the quality of bonding between the conductive ball 114 and the conductive pad 116, the lead frame strip 100 is immersed within a bath 200 of an etching solution. Referring to FIGS. 6 and 7, the intermediary material 120 is etched between the conductive ball 114 and the conductive pad 116 by the etching solution of the bath 200. For example, when the conductive ball 114 is comprised of gold and the conductive pad 116 is comprised of aluminum, the intermediary material 120 is comprised of an intermetallic alloy ($Au_xAl_y$) formed from the gold of the gold ball 114 and the aluminum of the aluminum pad 116, as known to one of ordinary skill in the art of IC package manufacture.

For such materials, in a preferred embodiment of the present invention, the quality of bonding between the conductive ball 114 and the conductive pad 116 may be consistently and accurately determined when the etching solution of the bath 200 is comprised of about 30% (weight/volume) sodium hydroxide (NaOH) and when the lead frame strip 100 is immersed within the bath 200 at a temperature of about 80° Celsius for a time period of about 1 minute. The bath 200 is heated to the predetermined temperature of 80° Celsius under control of a temperature controller 202.

Figure 8:
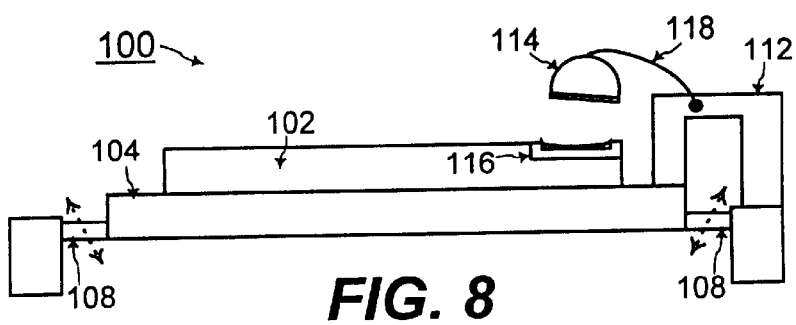
FIG. 8 illustrates the cross sectional view of the lead frame strip of FIG. 1 with decoupling of the conductive ball from the conductive pad, according to an embodiment of the present invention.

Referring to FIGS. 7 and 8, after the intermediary material between the conductive ball 114 and the conductive pad 116 is etched, the conductive ball 114 is decoupled away from the conductive pad 116. For the lead frame strip 100 having a plurality of conductive balls on a plurality of conductive pads, each of the plurality of conductive balls is decoupled from the plurality of conductive pads. However, just an example conductive ball 114 and an example conductive pad 116 are illustrated in FIG. 8 for clarity of illustration.

Figure 9:
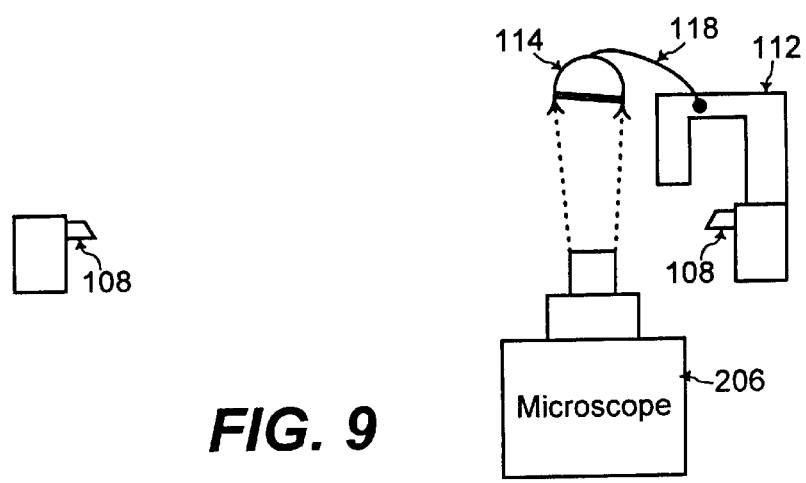
FIG. 9 illustrates cutting away of the die frame dap holding the IC die thereon from the lead frame strip of the IC package such that an image of the bottom of the conductive ball may be captured, according to an embodiment of the present invention.
Figure 10:
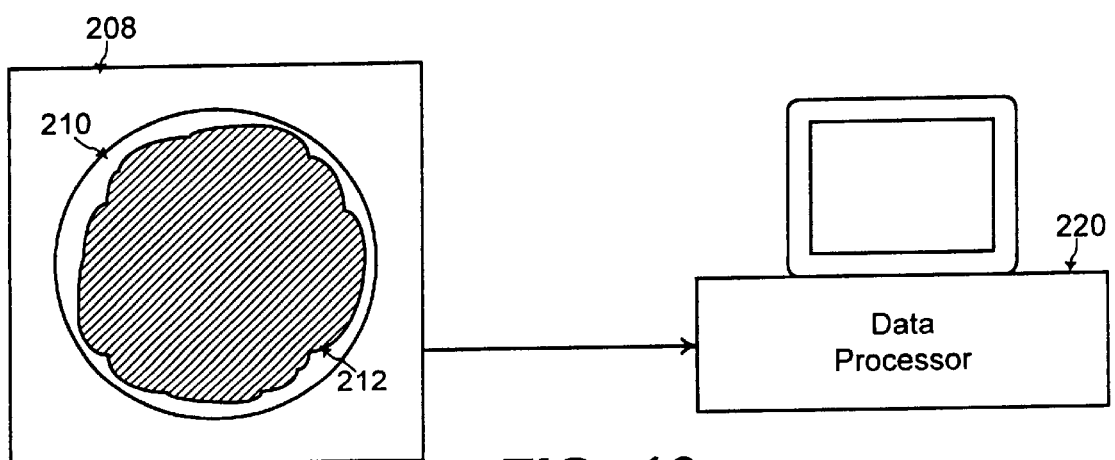
FIG. 10 illustrates processing of the image of the bottom of the conductive ball as captured in FIG. 9 for determining the quality of bonding between the conductive ball and the conductive pad, according to an embodiment of the present invention.

Referring to FIGS. 8 and 9, after the conductive balls are decoupled from the conductive pads of the IC die 102, the die frame dap 104 is cut away from the lead frame strip 100 at the tie bar 108. In this manner, the bottom of the conductive ball 114 is floating with the conductive ball 114 also being coupled to the lead frame strip 100 via the wire 118 such that an image of the bottom of the conductive ball 114 may easily be captured. Referring to FIGS. 9 and 10, a microscope 206 is used to capture a magnified image 208 of the bottom of the conductive ball 114. Microscopes that capture magnified images are known to one of ordinary skill in the art of IC package manufacture.

Referring to FIG. 10, the magnified image 208 includes an area 210 of the conductive ball 114 wherein the intermediary material 120 was not abutting the conductive ball 114 when the conductive ball was bonded to the conductive pad. The magnified image 208 also includes an intermediary material area 212 wherein the intermediary material 120 was abutting the conductive ball 114 when the conductive ball was bonded to the conductive pad. The microscope 206 is controlled such that the magnified image 208 has the intermediary material area 212 substantially centered within the magnified image 208.

The intermediary material area 212 appears as a first color in the magnified image 208. The area 210 of the conductive ball 114, outside of the intermediary material area 212 wherein the intermediary material 120 was not abutting the conductive ball 114, appears as a second color in the magnified image 208. For example, when the conductive ball 114 is comprised of gold and the conductive pad 116 is comprised of aluminum and the intermediary material is comprised of a gold and aluminum alloy ($Au_xAl_y$), the first color of the intermediary area 212 appears gray in the magnified image 208. The second color of the area 210 of the conductive ball 114 outside of the intermediary material area 212 appears gold in the magnified image 208.

The intermediary area 212 and the area 210 of the conductive ball 114 outside of the intermediary material area 212 within the magnified image 208 are then analyzed to determine the quality of bonding between the conductive ball 114 and the conductive pad 116. For example, in one embodiment of the present invention, the magnified image 208 may be processed by a data processor 220 which may be a computer for example as known to one of ordinary skill in the art of IC package manufacture. The data processor 220 may include an image processing application for determining the percentage of the intermediary material area 212 to the total area of the conductive ball 114 within the magnified image 208. One example of such an image processing application is Image-Pro software available from Media Cybernetics in Silver Spring, Md., and this Image-Pro software is commercially available to one of ordinary skill in the art of IC package manufacture.

In this manner, the percentage of the intermediary material area 212 to the total area of the conductive ball 114 within the magnified image 208 is a quantifiable measure of bonding between the conductive ball 114 and the conductive pad 116. A higher percentage indicates a higher quantity of bonding between the conductive ball 114 and the conductive pad 116. In addition, by viewing the whole area of the intermediary material 120, voids or contaminants present within the intermediary material 120 may be detected. The quality of bonding between the conductive ball 114 and the conductive pad 116 may be monitored in this manner during manufacture of IC packages such that corrective action may improve the quality of poor bonding.

In addition, applicants have by experimentation optimized the process parameters for etching the intermediary material 120 in the bath 200 of FIG. 6 to include an etching solution comprised of about 30% (weight/volume) sodium hydroxide (NaOH) at a temperature of about 80° Celsius and an etching time period of about 1 minute. Such etching conditions optimize etching a proper amount of intermediary material 120 between the conductive ball 114 and the conductive pad 116 such that the percentage of the intermediary material area 212 to the total area of the conductive ball 114 within the magnified image 208 may be consistently and accurately determined for a plurality of IC packages.

If the amount of intermediary material 120 between the conductive ball 114 and the conductive pad 116 is underetched, then the conductive ball 114 may not be decoupled from the conductive pad 116. On the other hand, if the amount of intermediary material 120 between the conductive ball 114 and the conductive pad 116 is over-etched, then the intermediary area 212 may be a smaller size resulting in determination of an inaccurate percentage of the intermediary material area 212 to the total area of the conductive ball 114 within the magnified image 208.

The foregoing is by way of example only and is not intended to be limiting. For example, the present invention is illustrated for an example lead frame strip of an IC package with an example conductive ball on a conductive pad. The present invention may be used with any other types of lead frame strips of IC packages, as would be apparent to one of ordinary skill in the art of integrated circuit manufacture from the description herein. In addition, the material of any structure specified herein is by way of example only.

Furthermore, as will be understood by those skilled in the art, the structures described herein may be made or used in the same way regardless of their position and orientation. Accordingly, it is to be understood that terms and phrases such as "top," "side," and "bottom" as used herein refer to relative location and orientation of various portions of the structures with respect to one another, and are not intended to suggest that any particular absolute orientation with respect to external objects is necessary or required.

The present invention is limited only as defined in the following claims and equivalents thereof.

We claim:

1. A system for determining quality of bonding between a conductive ball comprised of a first conductive material and a conductive pad comprised of a second conductive material within an IC package, the system comprising:

an intermediary material formed from said first conductive material of said conductive ball and said second conductive material of said conductive pad for bonding said conductive ball to said conductive pad when said conductive pad is bonded to said conductive ball;

a bath of etching solution for etching said intermediary material between said conductive ball and said conductive pad such that said conductive ball is decoupled from said conductive pad, said conductive ball having a first color in areas where said intermediary material was not abutting said conductive ball and having a second color in areas where said intermediary material was abutting said conductive ball when said conductive ball was bonded to said conductive pad;

and wherein said intermediary material was abutting said conductive ball on an intermediary material area of said conductive ball when said conductive ball was bonded to said conductive pad;

a lead frame strip of said IC package with said conductive ball being coupled via a wire to said lead frame strip of said IC package, and wherein said pad is disposed on an IC (integrated circuit) die supported by a die frame dap of said IC package, and wherein said die frame dap with said IC die thereon is cut away from said lead frame strip such that said conductive ball is floating via said wire that is coupled to said lead frame strip;

a microscope for capturing a magnified image of said intermediary material area on said conductive ball with said intermediary material area being substantially centered within said magnified image while said conductive ball is decoupled from said conductive pad;

and wherein said intermediary material area appears as said second color within said magnified image and wherein an area of said conductive ball wherein said intermediary material was abutting said conductive ball appears as said first color within said magnified image; and a data processor including a computer-readable medium having computer-executable instructions for analyzing said magnified image of said intermediary material area on said conductive ball to determine quality of bonding between said conductive ball and said conductive pad.

2. The system of claim 1, wherein said etching solution is comprised of about 30% (weight/volume) sodium hydroxide (NaOH), and wherein said system further comprises:

a temperature controller for maintaining a temperature of said etching solution at a temperature of about 80° Celsius.

3. The system of claim 1, wherein said data processor includes a computer-readable medium having computer-executable instructions for calculating a percentage of said intermediary material area to a total area of said conductive ball within said magnified image to determine quantity of bonding between said conductive ball and said conductive pad.

4. The system of claim 1, wherein said conductive ball is comprised of gold (Au).

5. The system of claim 4, wherein said conductive pad is comprised of aluminum (Al), and wherein said intermediary material is comprised of a gold and aluminum alloy ($Au_xAl_y$).

* * * * *